(12) United States Patent
Rodermund et al.

(10) Patent No.: US 10,995,531 B2
(45) Date of Patent: May 4, 2021

(54) SILL STRUCTURE AND GUIDE RAIL FOR SLIDING DOOR OF MOTOR VEHICLE

(71) Applicant: Volkswagen Aktiengesellschaft, Wolfsburg (DE)

(72) Inventors: Wilfried Rodermund, Danndorf (DE); Markus Thomitzek, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 92 days.

(21) Appl. No.: 16/444,643

(22) Filed: Jun. 18, 2019

(65) Prior Publication Data

US 2019/0383077 A1 Dec. 19, 2019

(30) Foreign Application Priority Data

Jun. 18, 2018 (DE) ...................... 10 2018 209 823.9

(51) Int. Cl.
*B60J 5/06* (2006.01)
*E05D 15/06* (2006.01)
*B62D 25/02* (2006.01)
*E05D 15/10* (2006.01)

(52) U.S. Cl.
CPC ............ *E05D 15/0656* (2013.01); *B60J 5/06* (2013.01); *B62D 25/025* (2013.01); *E05D 15/1047* (2013.01); *B60Y 2304/05* (2013.01); *E05Y 2900/531* (2013.01)

(58) Field of Classification Search
CPC ......................... E05D 15/0652; E05D 15/0656
USPC ....................................................... 296/155
See application file for complete search history.

(56) References Cited

U.S. PATENT DOCUMENTS

| | | | | |
|---|---|---|---|---|
| 3,708,192 A | * | 1/1973 | Klebba | ............... E05D 15/1047 292/261 |
| 4,981,321 A | * | 1/1991 | Watanabe | .................. B60J 5/06 296/155 |
| 6,299,241 B1 | * | 10/2001 | Heya | ...................... B62D 25/06 296/155 |

(Continued)

FOREIGN PATENT DOCUMENTS

| | | |
|---|---|---|
| DE | 10 2013 021 803 A1 | 6/2015 |
| DE | 20 2017 105 071 U1 | 9/2017 |

(Continued)

*Primary Examiner* — Jason S Morrow
*Assistant Examiner* — Kevin P Weldon
(74) *Attorney, Agent, or Firm* — Muncy, Geissler, Olds & Lowe, P.C.

(57) ABSTRACT

A motor vehicle having at least one side door opening formed in the body of the same and having a sliding door closing the same, wherein the side door opening has a sill structure for supporting and movably guiding the sliding door, wherein the sill structure has a hollow profile oriented in the vehicle longitudinal direction (x-direction) and formed as a welded part, and wherein the hollow profile on the vehicle exterior has a welding flange, extending along the sill structure and oriented in the vehicle vertical direction (z-direction), as a mounting flange for a door seal, which delimits an indentation formed in an upper section of the outer contour of the hollow profile. It is provided advantageously that a recess having at least one guide rail for a roller guide of the sliding door is disposed above the indentation, which recess is detachably secured to the sill structure.

9 Claims, 3 Drawing Sheets

(56) References Cited

U.S. PATENT DOCUMENTS

| | | | | |
|---|---|---|---|---|
| 6,709,045 | B2 * | 3/2004 | Shuto | B62D 25/02 |
| | | | | 296/155 |
| 6,781,058 | B1 * | 8/2004 | DeCicco | E05D 15/1047 |
| | | | | 174/72 A |
| 7,284,785 | B2 * | 10/2007 | Gotou | H02G 3/0475 |
| | | | | 174/72 A |
| 2001/0006298 | A1 * | 7/2001 | Tsubokura | B60J 5/06 |
| | | | | 296/155 |
| 2006/0113821 | A1 * | 6/2006 | Yokomori | B60J 5/06 |
| | | | | 296/155 |
| 2013/0201714 | A1 * | 8/2013 | Huang-Tsai | B60Q 1/323 |
| | | | | 362/545 |
| 2019/0382051 | A1 * | 12/2019 | Toyota | B60J 5/06 |

FOREIGN PATENT DOCUMENTS

| | | |
|---|---|---|
| EP | 2709866 B1 | 3/2014 |
| WO | WO 2008/072659 A1 | 6/2008 |

\* cited by examiner

SILL STRUCTURE AND GUIDE RAIL FOR SLIDING DOOR OF MOTOR VEHICLE

This nonprovisional application claims priority under 35 U.S.C. § 119(a) to German Patent Application No. 10 2018 209 823.9, which was filed in Germany on Jun. 18, 2018, and which is herein incorporated by reference.

BACKGROUND OF THE INVENTION

Field of the Invention

The present invention relates to a motor vehicle.

Description of the Background Art

For the purposes of the present description, the conventional direction of travel of a motor vehicle will be designated by "−x" ("minus x"), the direction opposite to its conventional direction of travel by "+x" ("plus x"), based on the conventional direction of travel (−x) the direction horizontally transverse to the x-direction viewed to the right by "+y," based on the conventional direction of travel (−x) the direction horizontally transverse to the x-direction viewed to the left by "−y," the direction vertically transverse to the x-direction viewed upwards by "+z," and the direction vertically transverse to the x-direction viewed downwards by "−z." This terminology for the spatial directions in Cartesian coordinates corresponds to the coordinate system generally used in the automotive industry. Moreover, terms such as "before," "behind," "above", "below", as well as terms with a similar meaning including the terms "right" and "left" are used in the way they are typically used to designate directions for a motor vehicle.

A motor vehicle is already known from EP 2 709 866 B1 having at least one side door opening, formed in the body thereof, for a sliding door closing it, which side door opening has a sill structure or step structure designed as a hollow profile with a component for supporting and movably guiding the sliding door. The component for supporting comprise a lower guide rail with a U-shaped profile cross section, open to the vehicle exterior. The guide rail is mounted above the hollow profile of the sill structure or step structure on the vehicle body.

According to the state of the art, a sill structure is known in which in the region of a side door opening for a sliding door has a hollow profile oriented in the vehicle longitudinal direction (x-direction) and formed as a welded part. On the upper side of the hollow profile, a welding flange extending along the sill structure and oriented in the vehicle vertical direction (y-direction) is formed as a mounting flange for a lower door seal. On the vehicle outer side of the hollow profile and below the height level of the welding flange, it has an opening which extends along the sill structure and in which a recess is welded having at least one guide rail for a roller guide of the sliding door. The recess is formed by a U-profile formed open toward the vehicle exterior. In the present case, the skilled artisan can easily comprehend the recess, together with the guide rail and roller guide, in a so-called wet space of the motor vehicle, i.e., below the lower door seal, which wet space is accordingly exposed particularly greatly to adverse environmental influences.

There was a need to relocate the recess together with the guide rail and roller guide into a so-called dry space so as to reduce adverse environmental influences as much as possible. In this respect, according to the state of the art, a sill structure is known in a publicly sold motor vehicle of the applicant, the structure which in the region of a side door opening for a sliding door has a hollow profile oriented in the vehicle longitudinal direction (x-direction) and formed as a welded part. On the vehicle exterior, the hollow profile has a welding flange, extending along the sill structure and oriented in the vehicle vertical direction (y-direction), as a mounting flange for a lower door seal. In this case, the welding flange delimits an indentation which is formed in an upper section of the outer contour of the hollow profile and which is also referred to among experts as a welding groove and provides the free space for a welding device joining the welding flange. On the vehicle interior side of the indentation, a recess with at least one guide rail for a roller guide of the sliding door is disposed above the hollow profile and therefore also above the height level of the welding flange and the lower door seal (dry space) and fixedly connected to the hollow profile by welding.

In practice, however, it has been found that the last-described arrangement of the recess for the roller guide of the sliding door requires a relatively long roller guide arm bridging the welding groove and connecting the sliding door to the body of the motor vehicle. Due to the resulting relatively long lever arm, increased forces, acting on the roller guide system, are experienced, which require increased expenditures for materials and therefore also for weight and an increased cost. This is addressed by the invention described below.

SUMMARY OF THE INVENTION

It is therefore an object of the present invention to provide a motor vehicle which, while retaining the advantages of the prior art in terms of optimal roller guidance of the sliding door, is reduced in terms of weight and cost.

Starting from a motor vehicle, having at least one side door opening formed in the body thereof and having a sliding door closing the same, wherein the side door opening has a sill structure for supporting and movably guiding the sliding door, wherein the sill structure has a hollow profile oriented in the vehicle longitudinal direction (x-direction) and formed as a welded part, and wherein the hollow profile on the vehicle exterior has a welding flange, extending along the sill structure and oriented in the vehicle vertical direction (y-direction), as a mounting flange for a door seal, which delimits an indentation formed in an upper section of the outer contour of the hollow profile, the stated object is achieved in that a recess having at least one guide rail for a roller guide of the sliding door is disposed above the indentation, which recess is detachably secured to the sill structure.

By this measure, in particular by the arrangement of the recess together with at least one guide rail, the recess projecting over the indentation, on the one hand, advantageously the roller guide arm connecting the sliding door to the body of the motor vehicle is formed shorter than is conventional, as a result of which further advantageously the acting forces are minimized and the roller guide arm can be made lighter. In addition, due to the detachable securing of the recess together with at least one guide rail by means of, for example, mechanical fasteners known per se, such as fastening screws, on the sill structure, a simple and cost-effective replacement of the recess together with at least one guide rail is made possible in particular in the case of wear of the same. In addition, this advantageously opens up the possibility of a simple and low-cost adjustment or readjustment of the recess together with the at least one guide rail.

In order to ensure a stable connection of the roller guide to the vehicle body, it is advantageously provided that the recess is formed by a U-profile which is formed open towards the vehicle exterior and which is supported on the hollow profile, on the one hand, via a support flange within the indentation of the hollow profile and, on the other, by means of at least one retaining bracket, secured to the hollow profile.

In order to enable a simple and cost-effective assembly and disassembly of the recess, it is formed by an upper recess part and by a lower recess part. It is provided that at least the upper recess part has a guide rail (upper guide rail) for the roller guide of the sliding door.

The upper guide rail is used in particular to support the roller guide together with the sliding door in the vehicle transverse direction (y-direction) in that it is formed by an elongated, downwardly open hollow profile. Also, the bottom recess part can have a guide rail (lower guide rail) for the roller guide of the sliding door, wherein this then advantageously enables support of the roller guide together with the sliding door in the vehicle vertical direction (z-direction). The first variant is provided in particular for so-called hanging sliding doors, which are supported on a guide rail system disposed above the side door opening, or hung on this, so to speak, whereas the second variant is provided for so-called standing sliding doors, supported on the sill structure, when viewed in the vehicle vertical direction (z-direction). Of course, the lower guide rail can also be omitted and the lower recess part itself be used to support the roller guide together with the sliding door in vehicle vertical direction (z-direction), provided that the lower recess part is dimensioned accordingly at least in the contact area with the guide roller of the roller guide.

In order to further minimize the expenditure of materials and costs, the upper guide rail further forms a step of the motor vehicle or is part of such a step. The latter measure in particular leads to a particularly rigid or deformation-resistant step.

As the invention further provides, the step can be assigned or can be assigned a cover which further increases the rigidity of the step and provides protection against the wear thereof.

In order to increase the rigidity of the step even further, the upper recess part and/or the step has a downwardly directed folded edge on the vehicle exterior.

The folded edge opens up the possibility of disposing one or more lights and/or sensors adjacent to the folded edge, which are accordingly covered by the invention. There is thus created a storage area, for example, for an elongated light, which advantageously allows directional illumination of the sill area or entry into the passenger compartment of the motor vehicle and/or is used as front end lighting for the ground in front of the sliding door.

It is provided further advantageously that a holder for a buffer system of the sliding door and/or a holder for a cable carrier for electrifying the sliding door are secured or formed at the step, whereby the assembly cost is further reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
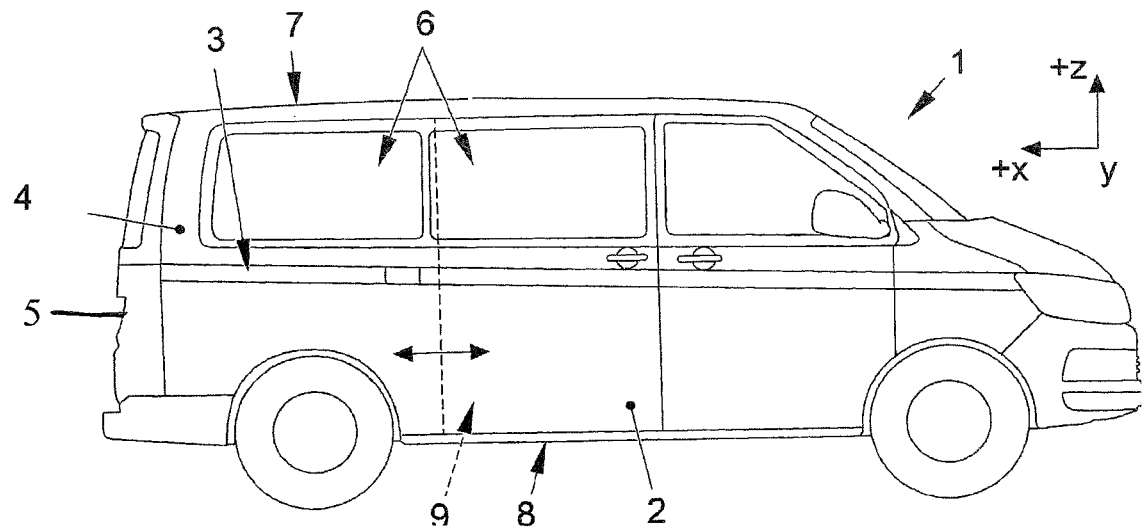
FIG. 1 shows very schematically a motor vehicle in a side view with a representation of a sliding door.

FIG. 1 initially shows a motor vehicle 1, in the present case as an example a minibus or a large capacity van with rear side doors, which are designed as sliding doors 2. Sliding doors 2 are guided movably in the vehicle longitudinal direction (x-direction) in guide rail systems 3 of motor vehicle 1. FIG. 1 shows a first guide rail system 3 mounted on body side wall 4 of body 5 of motor vehicle 1 and located near side windows 6 of motor vehicle 1. In addition, motor vehicle 1 per sliding door 2 has in addition at least one second guide rail system 3, which covered by closed sliding door 2 is located in the region of vehicle roof 7, and at least a third guide rail system 3, which covered by closed sliding door 2 is located in the region of sill structure 8 of side door opening 9, the sill structure being essential to the invention.

The present invention accordingly deals in particular with guide rail system 3 disposed in the region of sill structure 8 of side door opening 9.

Figure 2:
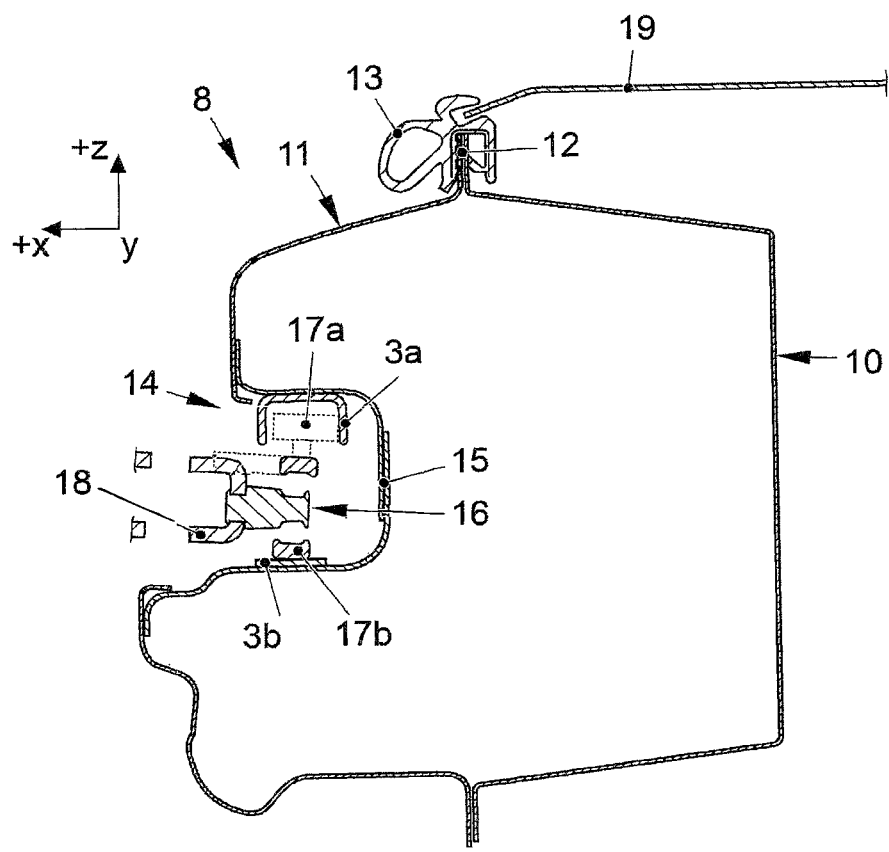
FIG. 2 shows a very schematic sectional representation of a first embodiment of a sill structure of the motor vehicle according to FIG. 1 according to the prior art, with a component for supporting and movably guiding the sliding door.

As already set forth by way of introduction, according to FIG. 2 a sill structure 8 is known in the prior art, which in the region of side door opening 9 for a sliding door 2 has a hollow profile 10 oriented in the vehicle longitudinal direction (x-direction) and formed as a welded part. On the upper side 11 of hollow profile 10, a welding flange 12, extending along sill structure 8 and oriented in the vehicle vertical direction (z-direction), is formed as a mounting flange for a lower door seal 13.

On the vehicle exterior of hollow profile 10 and below the height level of the welding flange 12, the profile has an opening 14 which extends along sill structure 8 and in which a recess 15 with a guide rail system 3, comprising an upper and a lower guide rail 3a, 3b for a roller guide 16 of sliding door 2, is welded. The recess 15 is formed by a U-profile open toward the vehicle exterior.

Upper guide rail 3*a* is formed as an elongated and downwardly open U-profile, whereas lower guide rail 3*b* is formed as a flat profile. Upper guide rail 3*a* is used to support an upper guide roller 17*a* of roller guide 16 together with sliding door 2 in the vehicle transverse direction (y-direction), whereas lower guide rail 3*b* is used to support a lower guide roller 17*b* of roller guide 16 together with sliding door 2 in the vehicle vertical direction (z-direction). Roller guide 16 is connected for this purpose via a roller guide arm 18 to sliding door 2.

In the present case, the recess 15, together with guide rails 3*a*, 3*b* and roller guide 16, is disposed in a so-called wet space of motor vehicle 1, i.e., below lower door seal 13, which wet space is accordingly exposed particularly greatly to adverse environmental influences. A step 19 associated with side door opening 9 and fixed to body 5 of motor vehicle 1 terminates in the region of door seal 13 or at the same.

Figure 3:
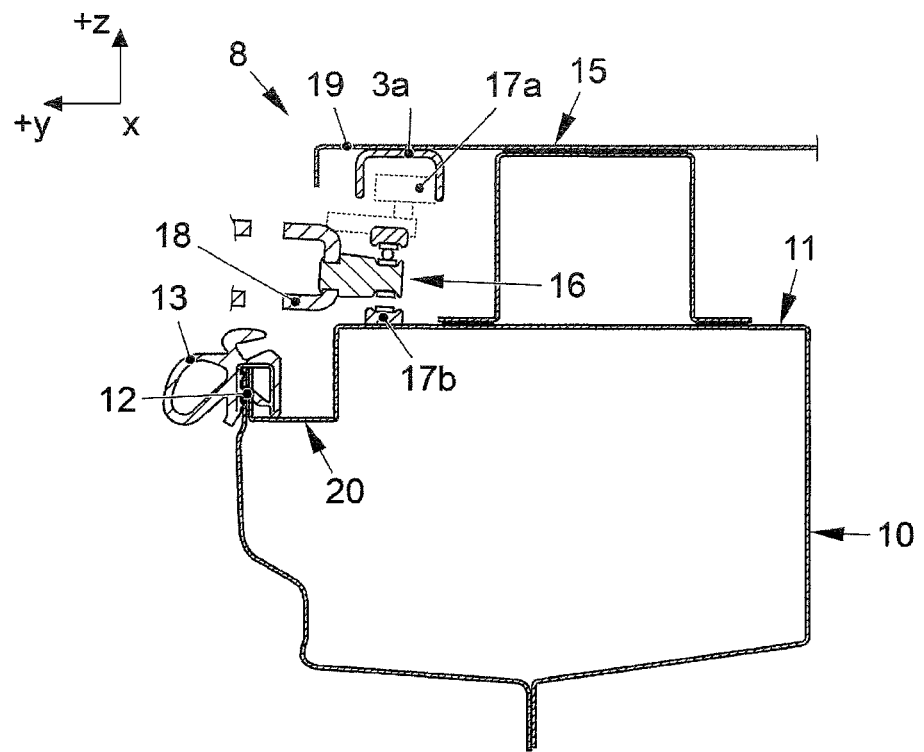
FIG. 3 shows a very schematic sectional representation of a second embodiment of a sill structure of the motor vehicle according to FIG. 1 according to the prior art, with a component for supporting and movably guiding the sliding door.

In order to reduce adverse environmental influences on the recess 15 together with guide rail system 3 and roller guide 16, recess 15 together with guide rail system 3 and roller guide 16 is relocated to a so-called dry space according to FIG. 3 according to the prior art. The related sill structure 8 also has a hollow profile 10 oriented in the vehicle longitudinal direction (x-direction) and formed as a welded part. In contrast to the exemplary embodiment of the prior art described above, hollow profile 10 now has on the vehicle exterior a welding flange 12, extending along sill structure 8 and oriented in the vehicle vertical direction (z-direction), as a mounting flange for a lower door seal 13. Welding flange 12 on the vehicle exterior side delimits an indentation 20, which is formed in an upper section of the outer contour of hollow profile 10 and which among experts is referred to as a welding groove and provides the space for a welding device joining welding flange 12.

A console-like recess 15 with only one upper guide rail 3*a* of guide rail system 3 for roller guide 16 of sliding door 2 is disposed on the vehicle interior side of indentation 20 above hollow profile 10 and therefore also above the height level of welding flange 12 and the lower door seal 13, attached thereto, (dry space) and is fixedly connected to top side 11 of hollow profile 10 by welding. In this case, console-like recess 15 at the same time forms step 19, which extends toward the vehicle exterior. Upper guide rail 3*a* is formed as an elongated and downwardly open U-profile and is secured to the underside of step 19 by welding. Upper guide rail 3*a* is used to support upper guide roller 17*a* of roller guide 16 together with the attached sliding door 2 in the vehicle transverse direction (y-direction). Downwards or in the z-direction, lower guide roller 17*b* of roller guide 16 together with the attached sliding door 2 is supported directly on upper side 11 of hollow profile 10, the side being adjacent to indentation 20 on the vehicle interior side. Roller guide 16 is for this purpose connected via roller guide arm 18 to sliding door 2.

Embodiment variants of the invention improving the prior art, in particular the embodiment of the same according to FIG. 3, will be described below with use of FIGS. 4 to 6.

Figure 4:
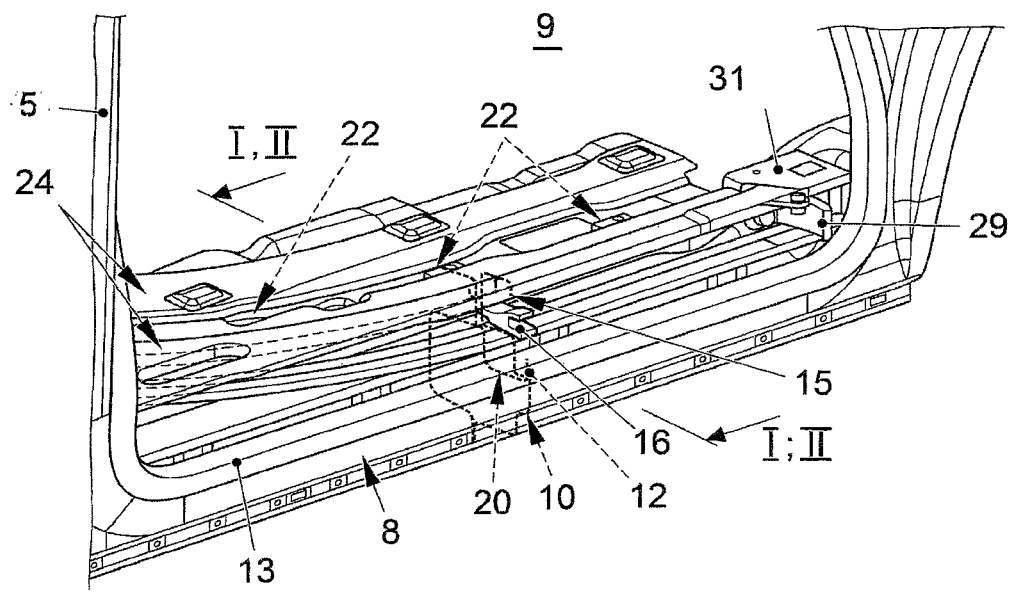
FIG. 4 shows a perspective representation of a side door opening for a sliding door of a motor vehicle designed according to the invention, with a sill structure, essential to the invention, together with a component for supporting and movably guiding the sliding door.

In an exemplary embodiment of the invention, FIG. 4 shows first a side door opening 9 of body 5 of motor vehicle 1, which can be closed by means of a sliding door 2. Within side door opening 9, a sill structure 8 extends in the vehicle longitudinal direction (x-direction), which based on the embodiment of FIG. 3 also has a hollow profile 10, oriented in the vehicle longitudinal direction (x-direction) and formed as a welded part, with a welding flange 12, extending along the same on the vehicle exterior and oriented in the vehicle vertical direction (z-direction), as a mounting flange for a lower door seal 13. Welding flange 12 thereby delimits on the vehicle exterior indentation 20 formed in the upper section of the outer contour of hollow profile 10 and referred to as a welding groove among experts.

Figure 5:
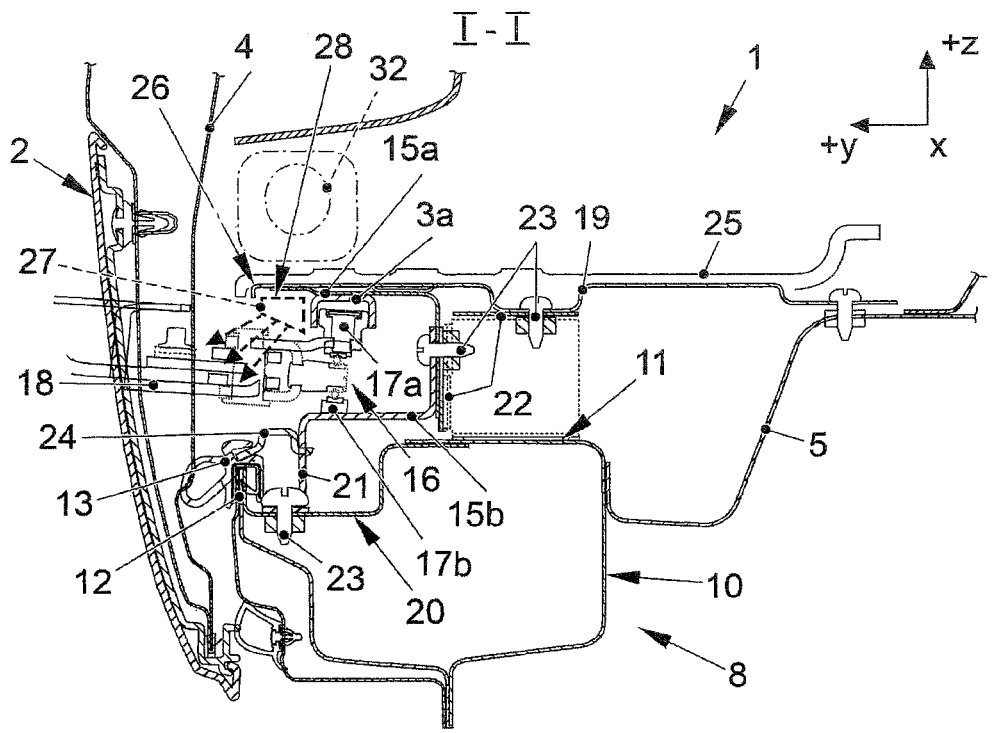
FIG. 5 shows the section "I-I" of FIG. 4, together with a representation of the sliding door according to a first embodiment of the invention.

In contrast to the prior art according to FIG. 3 in particular, with regard to FIG. 5 a recess 15, which is detachably secured to sill structure 8, is provided above the indentation 20. Recess 15 is formed by a U-profile, which is formed open toward the vehicle exterior and is supported on hollow profile 10, on the one hand, via a support flange 21 within indentation 20 of hollow profile 10 of sill structure 8 and, on the other, by means of fixed retaining brackets 22, secured to hollow profile 10, (also cf. FIG. 4 on this point).

According to this exemplary embodiment, each retaining bracket 22 is integrally connected in particular by welding to upper side 11 of hollow profile 10. Alternatively, retaining bracket 22 can also be detachably connected to hollow profile 10 by means of mechanical fastening elements known per se, such as fastening screws.

According to this exemplary embodiment, the recess 15 is formed in two parts and has an elongated upper recess part 15*a* and an elongated lower recess part 15*b*. In addition, according to this exemplary embodiment, upper recess part 15*a* and lower recess part 15*b* are detachably secured by means of mutual fastening screws 23 to retaining bracket 22. Lower recess part 15*b* forms the support flange 21 and is detachably secured by means of the same to hollow profile 10 of sill structure 8 within indentation 20 by means of fastening screws 23. The region of this screw connection is protected against dirt by means of at least one cover element 24.

Upper recess part 15*a* has an upper guide rail 3*a* of guide rail system 3, which upper guide rail 3*a* is used in particular to support upper guide roller 17*a* of roller guide 16 together with sliding door 2 in the vehicle transverse direction (y-direction). Upper guide rail 3*a* is formed by an elongated, downwardly open hollow profile, according to this exemplary embodiment by a U-profile. In addition, roller guide 16 is supported with its lower guide roller 17*b* together with sliding door 2, when viewed in the vehicle vertical direction (z-direction), directly on lower recess part 15*b*. For this purpose, roller guide 16 is connected to sliding door 2 via roller guide arm 18.

As can be gathered further from FIG. 5, upper recess part 15*a* together with upper guide rail 3*a* is part of a step 19, in that it supports the step from below and is fixedly connected to it, preferably integrally connected by welding. The step 19 is additionally detachably connected by means of fastening screws 23 to retaining bracket 22, so that upper recess part 15*a* together with upper guide rail 17*a* and step 19 can be mounted as a pre-joined mounting part. An extremely rigid or deformation-resistant part is created by the combination of upper guide rail 3*a* and step 19.

As can be gathered once again from FIG. 5, the step 19 is associated with a cover 25, which further increases the rigidity of step 19 and provides protection against the wear thereof. Preferably, the cover 25 is formed of a plastic, which is further preferably made wear-resistant and slip-resistant when it is stepped upon.

In order to increase still further the rigidity of step 19 or of the component assembly comprising step 19, upper guide rail 17*a*, and upper recess part 15*a*, step 19 has a downwardly directed folded edge 26 on the vehicle exterior. The folded edge 26 opens up the possibility of placing, adjacent to the same, one or more lights 27 (dashed lines) and/or sensors, for example, side impact sensors, which is accordingly also covered by the invention. A storage area 28, for example, for the lights 27, is created thereby, which enables directional illumination of the sill area or entry into the passenger compartment of motor vehicle 1.

Lastly, as can be gathered further from FIG. 4, according to this exemplary embodiment, further, a first holder 29 for a buffer system, known per se, of sliding door 2 and a second holder 31 for a cable carrier 32, known per se, for electrifying sliding door 2 are secured or formed at step 19 or integrally integrated into step 19. Advantageously, an additional connection for a buffer system and cable carrier 32 on body 5 is thereby avoided. The cable carrier 32 is also shown very schematically in FIG. 5.

Figure 6:
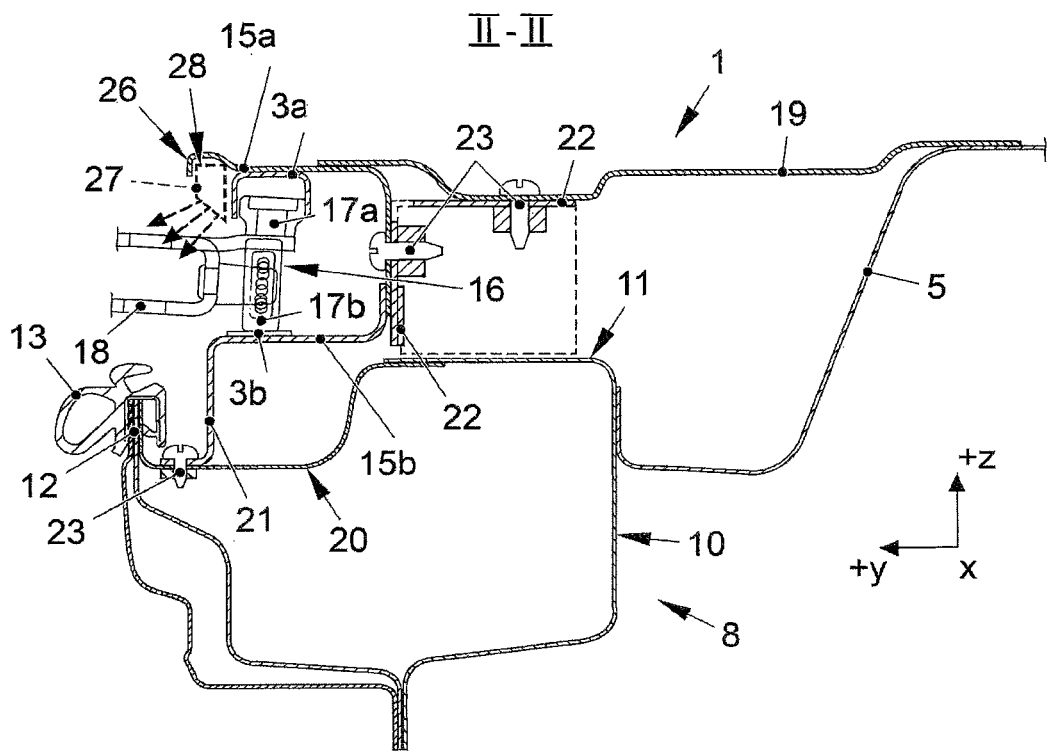
FIG. 6 shows the section "II-II" of FIG. 4 without a representation of the sliding door according to a second embodiment of the invention.

FIG. 6 shows a second embodiment of the invention, wherein functionally identical parts are designated by the same reference characters as in the previous figures, so that for the explanation thereof reference is also made to the previous explanation of the first embodiment variant of the invention. The depiction in particular of sliding door 2, cover 25 of step 19, and cable carrier 32 has been omitted here for the sake of simplicity.

This embodiment variant of the invention differs from the previously described variant first in that lower guide roller 17*b* of roller guide 16 is supported and rolls on a lower guide rail 3*b* of guide rail system 3, the lower guide rail being attached to lower recess part 15*b*. In addition, in contrast to the first embodiment variant of the invention according to FIG. 5, it can be ascertained that step 19 does not extend to the outer edge of sill structure 8 or forms the outer edge, but ends at a distance from the outer edge in the vehicle transverse direction (y-direction) and is supported on upper recess part 15*a* and is preferably integrally connected to the same, more preferably by welding.

The abovementioned folded edge 26 for reinforcing the composite component, formed of step 19, upper guide rail 3*a*, and upper recess part 15*a*, is in the present case formed by upper recess part 15*a*. The formed storage area 28 can likewise have one or more lights 27 (dashed lines) and/or sensors, for example, side impact sensors.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A motor vehicle comprising:
   at least one side door opening formed in a body of the motor vehicle;
   a sliding door adapted to enclose the body;
   a sill structure for supporting and movably guiding the sliding door, the sill structure having a hollow profile oriented in a vehicle longitudinal direction and formed as a welded part, a side of the hollow profile adjacent the vehicle exterior having a welding flange extending along the sill structure and oriented in a vehicle vertical direction as a mounting flange for a door seal, the flange delimiting an indentation formed in part of an upper side of the outer contour of the hollow profile; and
   a recess having a guide rail for a roller guide of the sliding door disposed above the indentation, the recess being detachably secured to the sill structure,
   wherein the recess is formed by a U-profile being formed open in a direction facing towards the vehicle exterior, the U-profile having a base portion, an upper side portion and a lower side portion, the upper side portion and the lower side portion each extending toward the vehicle exterior in the vehicle horizontal direction,
   wherein the recess is supported on the hollow profile via a support flange and via a retaining bracket,
   wherein a distal end of the lower side portion of the U-profile extends downward in the vehicle vertical direction to form the support flange, the support flange extending into the indentation of the hollow profile and being detachably secured to the indentation, and
   wherein the base portion of the U-profile is detachably secured to the retaining bracket, and the retaining bracket is secured to a portion of the upper side of the outer contour of the hollow profile at a position that is adjacent to the indentation.

2. The motor vehicle according to claim 1, wherein the recess is formed by an upper recess part and a lower recess part, wherein a first portion the upper recess part forms the upper side portion of the U-profile, wherein a first portion of the lower recess part forms the lower side portion of the U-profile and wherein a second portion of each of the lower recess part and the upper recess part together form the base portion of the U-profile.

3. The motor vehicle according to claim 2, wherein the guide rail includes an upper guide rail for the roller guide of the sliding door, the upper guide rail being fixed to a bottom surface of the upper recess part.

4. The motor vehicle according to claim 3, wherein the upper recess part is fixed to a bottom surface of a step of the motor vehicle.

5. The motor vehicle according to claim 4, wherein the step is covered by a cover.

6. The motor vehicle according to claim 4, wherein the upper recess part or the step has a downwardly directed folded edge on a side adjacent the vehicle exterior.

7. The motor vehicle according to claim 6, wherein at least one light and/or sensor is disposed adjacent to the folded edge.

8. The motor vehicle according to claim 1, wherein a holder for a cable carrier for electrifying the sliding door is secured on the step.

9. The motor vehicle according to claim 4, wherein the retaining bracket is detachably secured to the step.

* * * * *